US008705352B2

(12) United States Patent  
Chiu et al.

(10) Patent No.: US 8,705,352 B2
(45) Date of Patent: Apr. 22, 2014

(54) PRIORITIZED RANDOM ACCESS METHOD

(75) Inventors: Chun-Yuan Chiu, Pingtung County (TW); Yung-Han Chen, Hsinchu (TW); Yan-Xiu Zheng, New Taipei (TW); Yu-Chuan Fang, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 191 days.

(21) Appl. No.: 13/224,346

(22) Filed: Sep. 2, 2011

(65) Prior Publication Data

US 2012/0063305 A1 Mar. 15, 2012

Related U.S. Application Data

(60) Provisional application No. 61/381,786, filed on Sep. 10, 2010.

(51) Int. Cl.
*H04W 28/02* (2009.01)
*H04W 72/04* (2009.01)
*H04W 24/00* (2009.01)

(52) U.S. Cl.
USPC ............ 370/230; 370/241; 370/252; 370/329

(58) Field of Classification Search
USPC .............. 370/230, 241, 252, 330, 328, 338; 455/423, 452.1, 450, 512
See application file for complete search history.

(56) References Cited

U.S. PATENT DOCUMENTS

| | | | | |
|---|---|---|---|---|
| 6,567,396 B1 * | 5/2003 | Pohjanvouri et al. | ......... | 370/349 |
| 6,621,803 B2 * | 9/2003 | Halton et al. | ................ | 370/329 |
| 7,733,896 B2 * | 6/2010 | Chuah et al. | .................. | 370/444 |
| 2002/0118661 A1 * | 8/2002 | Voce | .............................. | 370/337 |
| 2004/0192320 A1 * | 9/2004 | Khawand et al. | .......... | 455/452.1 |
| 2008/0101313 A1 | 5/2008 | Choi et al. | | |
| 2010/0074204 A1 * | 3/2010 | Meylan | ......................... | 370/329 |
| 2010/0112976 A1 | 5/2010 | Turina | | |
| 2010/0135205 A1 | 6/2010 | Li et al. | | |
| 2010/0227636 A1 * | 9/2010 | Kwon et al. | .................... | 455/512 |

FOREIGN PATENT DOCUMENTS

CN 101272608 9/2008

OTHER PUBLICATIONS

Marks et al., "Part 16: Air Interface for Broadband Wireless Access Systems" IEEE P802.16m/D12, Feb. 17, 2011, 1-1120.
3GPP, "Radio Resource Control (RRC)" Technical Specification 36.331, Dec. 2010, 1-276.
"Office Action of China Counterpart Application", issued on Nov. 4, 2013, p. 1-p. 7.

* cited by examiner

*Primary Examiner* — Rasheed Gidado
(74) *Attorney, Agent, or Firm* — Jianq Chyun IP Office

(57) ABSTRACT

Prioritized random access methods are proposed. According to an embodiment, random access attempts are classified into the priority levels according to delay requirements, and adedicated random access opportunities are reserved for different priority levels. A congestion detecting mechanism is introduced for such dedicated ranging (random access) opportunities. When congestion is detected by the base station, parameters or configurations of random access can be dynamically or temporarily modified through random access response message. Furthermore, a prioritized contention resolution is introduced to guarantee a high priority access is processed earlier than a low priority access. According to another embodiment, another prioritized contention resolution is introduced to reduce the impact of random access of a low priority M2M device upon H2H traffic.

30 Claims, 8 Drawing Sheets

PRIORITIZED RANDOM ACCESS METHOD

CROSS-REFERENCE TO RELATED APPLICATION

This application claims the priority benefits of U.S. provisional application Ser. No. 61/381,786, filed on Sep. 10, 2010. The entirety of the above-mentioned patent applications is hereby incorporated by reference herein and made a part of this specification.

BACKGROUND

1. Technical Field

The disclosure generally relates to a prioritized random access method for wireless communication devices with different priority levels.

2. Related Art

Machine to Machine (M2M) communications (also called machine-type-communication, abbreviated as MTC) is a very distinct capability that enables the implementation of the "Internet of things". It is defined as information exchange between a subscriber station (or a wireless communication device) and a server in the core network (through a base station) or just between subscriber stations, which may be carried out without any human interaction. Several industry reports have scoped out huge potential for this market. Given the huge potential, some novel broadband wireless access systems, such as 3GPP LTE and IEEE 802.16m, have started to develop enhancements for enabling M2M communications.

In some use case models of M2M communications, such as healthcare, secured access & surveillance, public safety, and remote maintenance & control, high priority access is necessary in order to communicate alarms, emergency situations or any other device states that require immediate attention. Besides, for battery-limited M2M devices, consuming extremely low operational power over long periods of time is required. Such M2M devices may be in idle mode at most time for power saving. Hence, prioritized ranging (or random access) is an essential function for idle M2M devices while they want to transmit delay-sensitive messages to the M2M server(s). On the other hand, in such urgent cases, the backbone wireless communication system should have ability to provide enough ranging capacity for those delay-sensitive applications even if it may be a rare case of mass ranging attempts for emergency occurring simultaneously.

According to current IEEE 802.16m specification, when an idle mobile station wants to perform network entry, it will receive the system information carried in a superframe header at first for knowing the current configuration of ranging code partition. The Code Division Multiple Access (CDMA) ranging codes are divided into initial ranging codes and handover ranging codes. After obtaining the current configuration of ranging code partition, the mobile station randomly selects an initial ranging code to perform CDMA ranging. If the base station detects the ranging code, the base station responds by a MAC (Medium Access Control) control message, AAI_RNG-ACK, to indicate whether the CDMA ranging is successful or not. If the CDMA ranging is successful, the base station allocates uplink (UL) bandwidth to the mobile station subsequently. Then, the mobile station uses the allocated bandwidth to transmit AAI_RNG-REQ and waits for the corresponding response message, AAI_RNG-RSP.

As in the aforementioned description, it is known that there is no design for prioritized ranging (or random access) in IEEE 802.16m currently. However, it may result in contentions and collisions during network entries between an emergency access and a normal access. If an idle M2M device performs CDMA ranging for transmitting delay-sensitive message with the same ranging opportunity used by the mobile station (i.e., using the same code at the same time and frequency resource), the base station cannot detect that the same ranging code(s) were transmitted from two different devices. Therefore, after receiving AAI_RNG-ACK, the mobile station and the M2M device assume their CDMA ranging is successful and then the following AAI_RNG-REQ messages transmitted from these two devices will collide. Subsequently, the base station may recognize one of these two AAI_RNG-REQ messages or lose the both two. If a mobile station does not receive the corresponding AAI_RNG-RSP message, it will perform CDMA ranging again. As such, time consumed by random access and contention resolution is a dominant time during network entry.

The random access procedure in 3GPP LTE specification is similar to the aforementioned ranging procedure in IEEE 802.16m. 3GPP LTE additionally introduces a mechanism, called Access Class Barring (ACB), to configure different barring factors and barring times for each access class. If ACB is configured, an user equipment (UE) should draw a random number uniformly distributed in the range 0 to 1 before performing random access. If the random number is greater than the barring factor associated to the UE, the UE considers random access as barred and postpones its access attempt until a timer expires, where the timer is calculated from the barring time associated to the UE. Although ACB can differentiate the access probabilities of different access classes, it can not guarantee that a high priority random access is served earlier than a low priority random access while contention occurs. Therefore, it is a major concern to modify the conventional random access protocols so as to achieve prioritized random access with congestion detection and contention resolution.

SUMMARY

A prioritized random access method is introduced herein. According to an exemplary embodiment, the prioritized random access method is adapted for a base station detecting random access congestion, and includes following procedures: classifying random access attempts of wireless communication devices into at least a priority level according to delay requirements of the random access attempts; associating each of the priority levels respectively with a set of dedicated random access opportunities; broadcasting default configuration of the dedicated random access opportunities; receiving random access messages from the wireless communication devices; detecting congestion of the random access messages; changing the dedicated random access opportunities when the congestion of some random access messages is detected; and notifying the change of the dedicated random access opportunities by a response message to some wireless communication devices, whose transmitted random access messages are congested.

A prioritized random access method is introduced herein. According to an exemplary embodiment, the prioritized random access method is adapted for a wireless communication device achieving prioritized contention resolution, and includes following procedures: using a random access opportunity to transmit a random access message with a base station; receiving a random access response from the base station as a response for the random access message, wherein the random access response comprises an uplink grant; receiving an indication from the base station; and determining to give up uplink grant from the base station according to the indication and the priority level of the random access message.

A prioritized random access method is introduced herein. According to an exemplary embodiment, the prioritized random access method is adapted for a wireless communication device transmitting a delay-sensitive message, and includes following procedures: transmitting a first random access message using a first random access code from a code set $C_a^{(0)}$ of a default configuration for a priority $P_a$; receiving a first random access response with a first indicator from the base station, wherein the first indicator indicates the default configuration being changed to a current configuration i; determining whether a code set $C_a^{(i)}$ of the current configuration, i, is the same as the code set $C_a^{(0)}$ of the default configuration; determining whether the first random access message is successful according to the first random access response; transmitting subsequent request message by using allocated uplink grant from the base station when the first random access message is successful and the code set $C_a^{(i)}$ is the same as the code set $C_a^{(0)}$; completing network entry; and transmitting the delay-sensitive message.

A prioritized random access method is introduced herein. According to an exemplary embodiment, the prioritized random access method is adapted for a wireless communication device performing a network entry, and includes following procedures: transmitting a first random access message using a first random access code from a code set $C_{IN}^{(0)}$ arranged for initial random access of a default configuration; receiving a first random access response with a first indicator from the base station, wherein the first indicator indicates the default configuration being changed to a current configuration i; determining whether the first random access code belongs to the code set $C_{IN}^{(i)}$ of the current configuration i; determining whether the first random access message is successful according to the first random access response; transmitting subsequent request message by using allocated uplink grant from the base station when the first random access code belongs to the code set $C_{IN}^{(i)}$ and the first random access message is successful; and completing the network entry.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION

Figure 1:
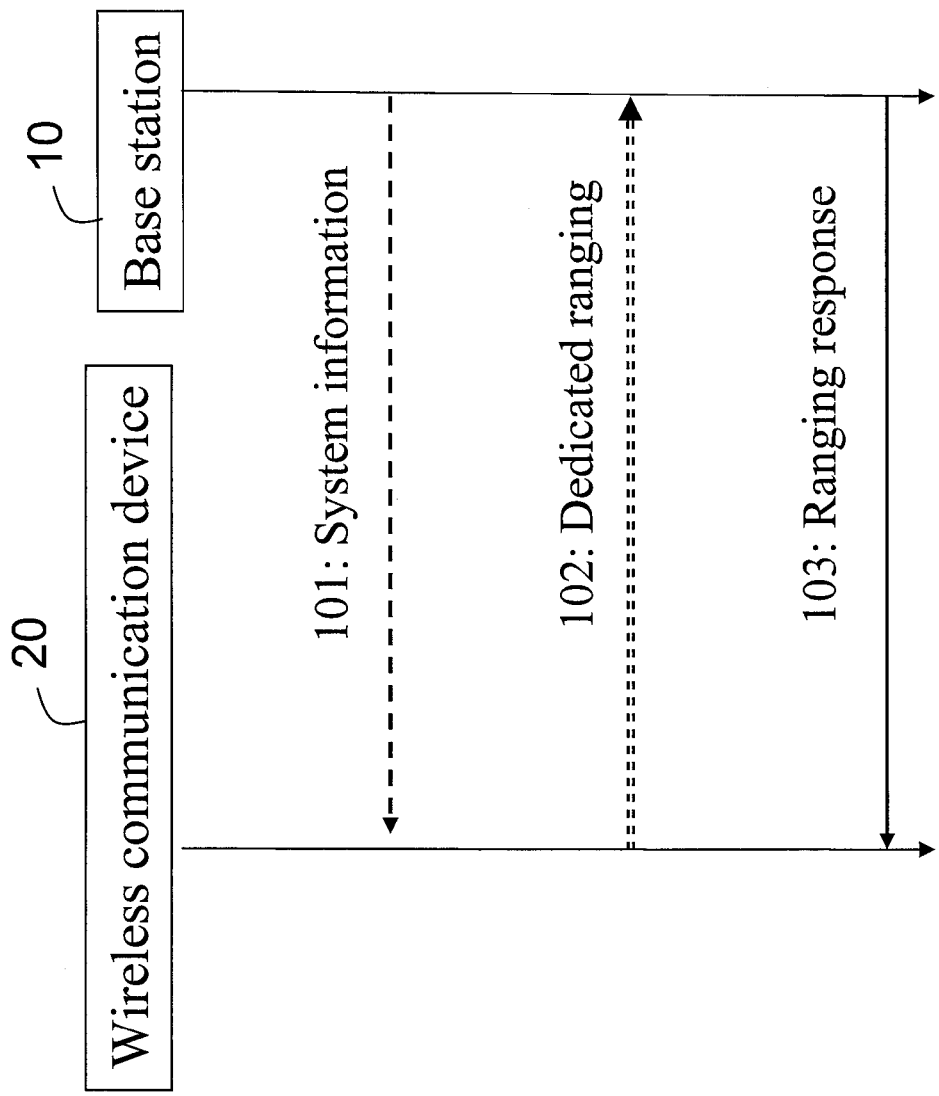
FIG. 1 illustrates a dedicated ranging process according to a first exemplary embodiment.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

In the present disclosure, there are proposed functionalities of prioritized random access (also known as ranging) method to satisfy the delay requirements of most Machine-to-Machine applications (also called the MTC type applications). Therefore, the conventional random access protocols are modified so as to achieve prioritized random access with congestion detection and contention resolution mechanisms.

Throughout the disclosure, the user equipment (UE) can refer to a, wireless communication device, a mobile station, an advanced mobile stations, a wireless terminal communication device, a M2M device, a MTC device, and so fourth. The UE can be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, and so fourth. Also, the base station (BS) can refer to an advanced base station, a node B, an enhanced node B (eNB), and so fourth.

In the present disclosure, the term "downlink" (DL) refers to the RF signal transmission from a base station to a wireless communication device within the radio coverage of the base station; the term "uplink" (UL) refers to the RF signal transmission from a wireless communication device to its access base station.

The present disclosure proposes a prioritized random access method for supporting prioritized random access of wireless communication devices in wireless communication systems. It is assumed, in the disclosure, that all ranging (random access) attempts are classified into several priority levels in advance according to their priority. The proposed prioritized random access method can guarantee that a high priority ranging (random access attempt) should be served earlier than a low priority ranging (random access attempt).

For some priority level(s), especially for a high priority level, it can be associated with a set of dedicated ranging (random access) opportunities, which are just reserved for the priority level. The dedicated ranging (random access) opportunities can be, for example dedicated codes, dedicated time slots, dedicated frequency resources, or any combinations of the dedicated codes, the dedicated time slots, or the dedicated frequency resource. Since dedicated ranging (random access) opportunities are reserved for high priority levels, a base station can serve high priority ranging (random access) attempts at first after detecting the dedicated ranging (random access) opportunities, as shown in FIG. 1.

Figure 2:
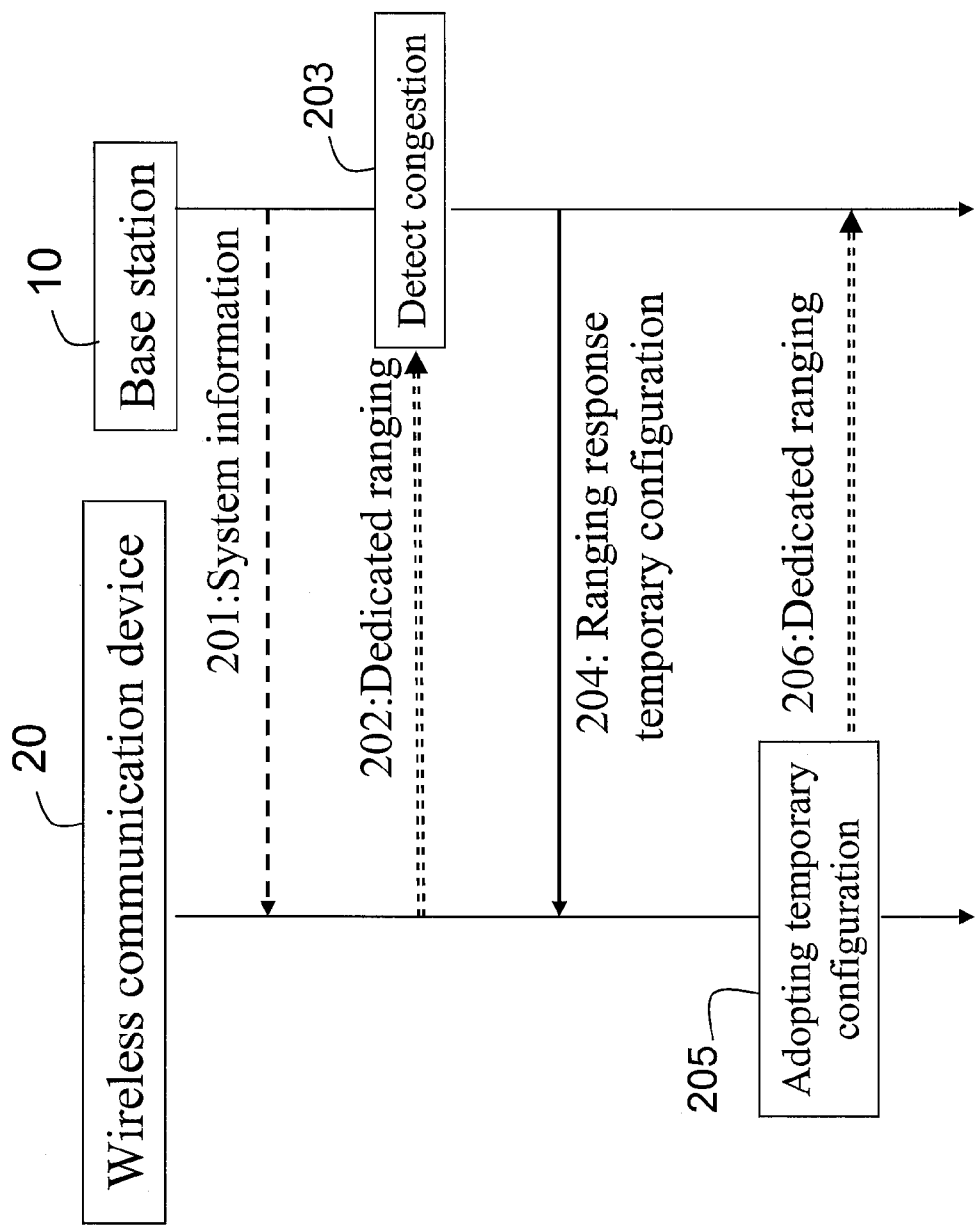
FIG. 2 illustrates a congestion detecting mechanism according to the first exemplary embodiment.

In the present disclosure, if a base station detects congestion of ranging (random access) opportunities reserved for some priority level(s), the base station can increase ranging (random access) opportunities dynamically for the priority level to relieve congestion (or the random access congestion). The increased ranging (random access) opportunities can be, for example, temporarily borrowed from other lower priority levels, or extra ranging (random access) opportunities in a new piece of radio resource in code, time or frequency domains. Besides, the base station can notify mobile stations of the configuration of ranging (random access) opportunities changing (i.e., ranging opportunities reserved for some priority levels is temporarily increased or decreased) through ranging (random access) response messages (i.e., AAI_RNG-ACK in 802.16m and Random Access Response, RAR, in LTE). If the mobile station performs CDMA ranging (random access) and the following ranging (random access) response indicates that the configuration of ranging (random access) opportunities is temporarily changed, the mobile station (or the receiving wireless communication devices) can attempt performing CDMA ranging (random access) again by using the new configuration, as shown in FIG. 2.

Figure 3:
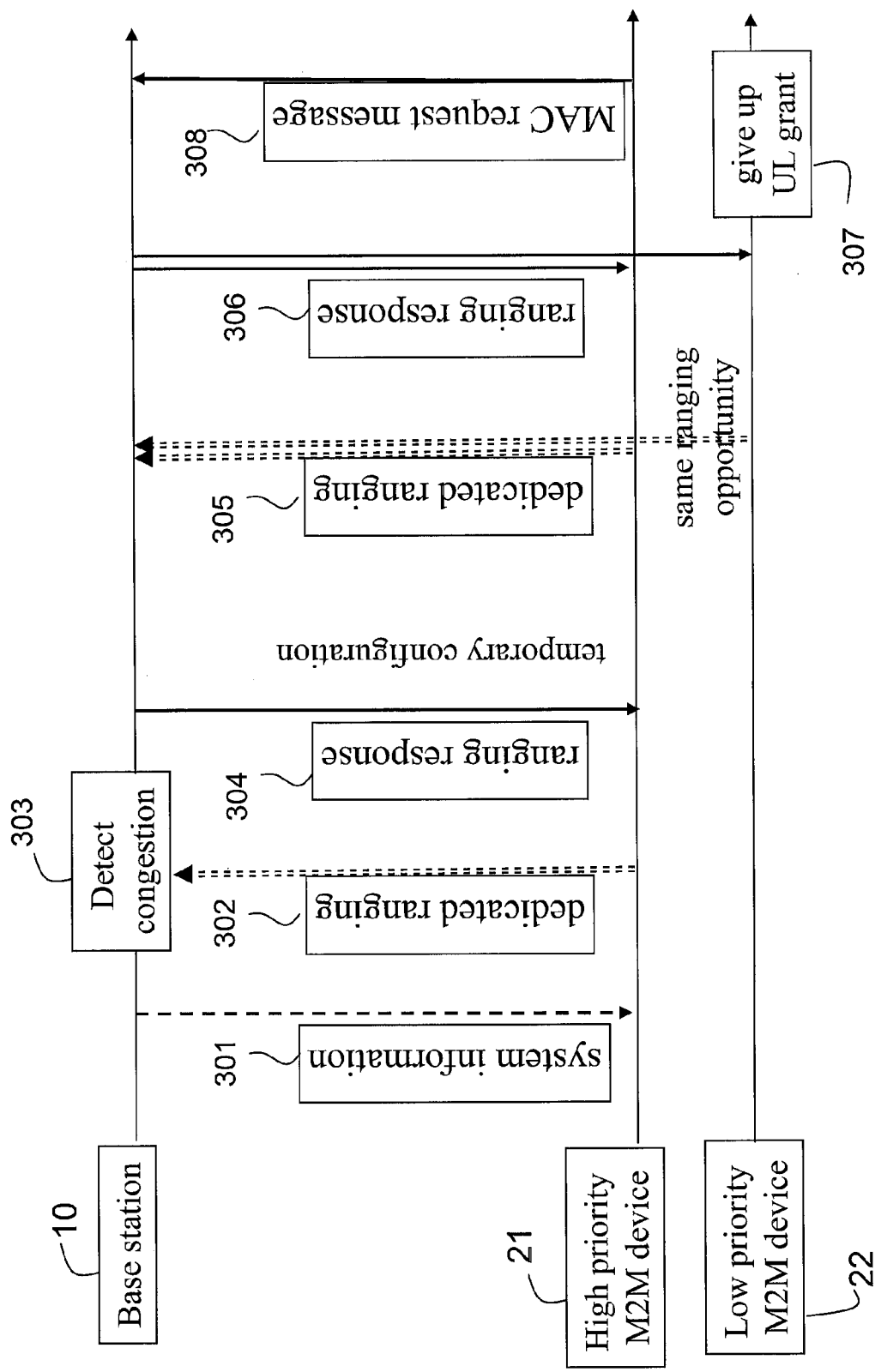
FIG. 3 illustrates a prioritized contention resolution operation according to the first exemplary embodiment.

When the increased ranging (random access) opportunities are borrowed from other lower priority levels, since the ranging (random access) response is not broadcast information, a wireless communication device, which performs low priority ranging (random access) attempt, may be unaware of ranging (random access) opportunities changing. Besides, the wireless communication device, which performs low priority ranging (random access) attempt, may use a ranging (random access) opportunity which had been lent to the higher priority level, thereby resulting in collision. As shown in FIG. 3, in the present disclosure, the wireless communication device, which performs low priority ranging (random access) attempt, shall give up using allocated uplink (UL) bandwidth to transmit the following MAC request message (i.e., AAI_RNG-REQ in 802.16m and RRC Connection Request in LTE) when an indication is received from the base station, where the indication can be included in ranging (random access) response, and the indication can explicitly/implicitly indicate the UL grant bandwidth can be also used by a high priority ranging (random access) attempt.

First Exemplary Embodiment

In the first exemplary embodiment, there are five major proposals for the prioritized random access method. The first proposal is "Dedicated ranging (random access) codes for each priority level"; the second proposal is "Detecting congestion of ranging (random access) codes reserved for some priority level"; the third proposal is "Temporary configurations of code partition"; the fourth proposal is "Dynamically and temporarily changing configuration to increase or decrease ranging codes for some priority level"; the fifth proposal is "Prioritized contention resolution".

In the first proposal, in order to provide prioritized CDMA ranging (random access), each priority level is associated with a set of dedicated ranging (random access) codes, which are just reserved for the priority level. It is assumed that all purposes of ranging (random access) attempts except initial ranging (random access) and handover ranging (random access) are classified into n priority levels, $P_1, P_2, \ldots, P_n$, based on the device type or flow type, where $n \geq 1$. For example, the device type can be a normal UE, a high priority M2M device, or a low priority M2M device. The priority order is $P_1 \geq P_2 \geq P_3 \geq \ldots \geq P_n$.

A priority level $P_a$ is associated with a default ranging (random access) code set $C_a^{(0)}$. Hence, the default configuration of code partition is $\{C_1^{(0)}, C_2^{(0)}, \ldots, C_n^{(0)}, C_{IN}^{(0)}, C_{HO}^{(0)}\}$, where the $C_{IN}^{(0)}$ and $C_{Ho}^{(0)}$ are the default ranging (random access) code sets for initial ranging (random access) and handover ranging (random access), respectively. The default configuration of code partition is indicated in system information and can be, for example, determined based on the average ranging (random access) arrival rate of each priority level (including initial ranging (random access) and handover ranging). The default configuration is not changed frequently. The base station in the wireless communication network can be responsible for determining the average ranging (random access) arrival rate of each priority level.

FIG. 1 illustrates a dedicated ranging (random access) process according to the first exemplary embodiment. Referring to FIG. 1, a wireless communication device 20 intends to perform a delay-sensitive access and the wireless communication device 20 had been assigned higher priority (e.g., priority level $P_1$) by the network or the base station 10. In step 101, the wireless communication device 20 receives the system information, where the system information contains the default configuration of code partition $\{C_1^{(0)}, C_2^{(0)}, \ldots, C_n^{(0)}, C_{IN}^{(0)}, C_{HO}^{(0)}\}$. The wireless communication device 20 randomly selects a dedicated ranging (random access) code from the default ranging (random access) code set $C_1^{(0)}$ which is reserved for the priority level $P_1$. In step 102, the wireless communication device 20 performs the dedicated ranging (random access) with the selected ranging (random access) code. In step 103, after detecting (or receiving) the dedicated ranging (random access) from the wireless communication device 20, the base station 10 serves the dedicated ranging (random access) at first, and replies a ranging (random access) response as a response for the dedicated ranging (random access) to the wireless communication device 20.

In the second proposal, there is proposed a congestion detecting mechanism for the prioritized random access method, especially for detecting whether a priority level is a congestion level. The base station can continuously monitor the utility rate of each priority level over a pre-defined period. In the second proposal, for some priority level $P_a$, when the base station discovers that the utility rate of ranging (random access) codes which belong to code set, $C_a^{(0)}$, is greater than a pre-defined utility upper threshold during a pre-defined short period, the code set $C_a^{(0)}$ is a congestion set. For example, the pre-defined utility upper threshold is 55%, and the pre-defined short period is 20 milliseconds. When the code set, $C_a^{(0)}$, or the code set, $C_a^{(i)}$, is a congestion set, where i is the current index of temporary configuration, the level $P_a$ is a congestion level. The base station should continuously monitor whether a priority level is congestion level or not. When a congestion level is detected, the third proposal can be used to temporarily relieve the random access congestion.

FIG. 2 illustrates a congestion detecting mechanism according to the first exemplary embodiment. In fact, FIG. 2 also illustrates an example to temporarily change current configuration through a ranging response (or a random access response) message, which shall be described in the third proposal. Referring to FIG. 2, the wireless communication device 20 intends to perform a delay-sensitive access and the wireless communication device 20 had been assigned higher priority (e.g., priority level $P_1$) by the network or the base station 10. Step 201 and step 202 are similar to the step 101 and 102, in which the wireless communication device 20 receives the system information, and performs the dedicated ranging (random access) with a selected ranging (random access) code from the default ranging (random access) code set $C_1^{(0)}$.

In step 203, the base station 10 detects the priority level $P_1$ (in the current configuration) is congestion level. Thus, in step 204, the base station 10 replies a ranging (random access) response to the wireless communication device 20 and also notifies the wireless communication device 20 of changing to a temporary configuration (or a configuration change) through the ranging (random access) response. In step 205, the wireless communication device 20 adopts the temporary configuration. In step 206, the wireless communication device 20 sends another dedicated ranging (random access) to the base station 10 by using the temporary configuration.

In the third proposal, the default code partition $\{C_1^{(0)}, C_2^{(0)}, \ldots, C_n^{(0)}, C_{IN}^{(0)}, C_{HO}^{(0)}\}$ can be temporarily changed to other configuration $i = \{C_1^{(i)}, C_2^{(i)}, \ldots, C_n^{(i)}, C_{IN}^{(i)}, C_{HO}^{(i)}\}$ based on the load of each priority level. As shown in the step 204, the temporary configurations can be pre-defined and indicated by ranging (random access) response message (or random access response message). Each temporary configuration can be, for example, a rearrangement rule operated on the default configuration. In other words, if there are pre-defined A default configurations and B temporary configurations (rearrangement rules), there can be totally A×B configurations of code partition. Table I shows an example of design principle for such temporary configurations. The design principle is that some ranging (random access) codes reserved for some lower priority levels can be temporarily lent to a higher priority level.

TABLE I

| Configuration | $P_1$ | $P_2$ | $P_3$ | IN | HO |
|---|---|---|---|---|---|
| 0 | $C_1^{(0)}$ | $C_2^{(0)}$ | $C_3^{(0)}$ | $C_{IN}$ | $C_{HO}$ |
| 1 | $C_1^{(0)} + C_1$ | $C_2^{(0)}$ | $C_3^{(0)}$ | $C_{IN2}$ | $C_{HO2}$ |
| 2 | $C_1^{(0)} + C_2$ | $C_2^{(0)}$ | $C_3^{(0)}$ | $C_{IN1}$ | $C_{HO1}$ |
| 3 | $C_1^{(0)} + C^+$ | $C_2^{(0)}$ | $C_3^{(0)}$ | $\phi$ | $\phi$ |
| 4 | $C_1^{(0)}$ | $C_2^{(0)} + C_1$ | $C_3^{(0)}$ | $C_{IN2}$ | $C_{HO2}$ |
| 5 | $C_1^{(0)}$ | $C_2^{(0)} + C_2$ | $C_3^{(0)}$ | $C_{IN1}$ | $C_{HO1}$ |
| 6 | $C_1^{(0)}$ | $C_2^{(0)} + C^+$ | $C_3^{(0)}$ | $\phi$ | $\phi$ |
| 7 | $C_1^{(0)}$ | $C_2^{(0)}$ | $C_3^{(0)} + C_1$ | $C_{IN2}$ | $C_{HO2}$ |
| 8 | $C_1^{(0)}$ | $C_2^{(0)}$ | $C_3^{(0)} + C_2$ | $C_{IN1}$ | $C_{HO1}$ |
| 9 | $C_1^{(0)}$ | $C_2^{(0)}$ | $C_3^{(0)} + C^+$ | $\phi$ | $\phi$ |
| 10 | $C_1^{(0)} + C_1$ | $C_2^{(0)} + C_2$ | $C_3^{(0)}$ | $\phi$ | $\phi$ |
| 11 | $C_1^{(0)} + C_1$ | $C_2^{(0)}$ | $C_3^{(0)} + C_2$ | $\phi$ | $\phi$ |
| 12 | $C_1^{(0)} + C_2$ | $C_2^{(0)} + C_1$ | $C_3^{(0)}$ | $\phi$ | $\phi$ |
| 13 | $C_1^{(0)} + C_2$ | $C_2^{(0)}$ | $C_3^{(0)} + C_1$ | $\phi$ | $\phi$ |
| 14 | $C_1^{(0)}$ | $C_2^{(0)} + C_1$ | $C_3^{(0)} + C_2$ | $\phi$ | $\phi$ |
| 15 | $C_1^{(0)}$ | $C_2^{(0)} + C_2$ | $C_3^{(0)} + C_1$ | $\phi$ | $\phi$ |

In order to understand the design principle for the default configurations and the temporary configurations, certain notations in Table I are explained in accordance with Table II below. Table II provides an example to explain the notations shown in Table II. For example, $C_1^{(0)}$ refers to the code set used for the priority level, $P_1$, in the configuration 0. In the present disclosure, the configuration 0 refers to the default configuration. For example, initially in the default configuration, there are 4 codes arranged for $C_1^{(0)}$; 2 codes arranged for $C_2^{(0)}$; 2 codes arranged for $C_3^{(0)}$. $C_{IN}$ refers to the code set arranged for initial ranging (random access) in the configuration 0, where $C_{IN1}$ is the first half of the code set $C_{IN}$; $C_{IN2}$ is the second half of the code set $C_{IN}$. For example, initially in the default configuration, there are arranged 12 codes for $C_{IN1}$; 12 codes for $C_{IN2}$.

TABLE II

| Code set |
|---|
| $C_1^{(0)}$: 4 codes |
| $C_2^{(0)}$: 2 codes |
| $C_3^{(0)}$: 2 codes |
| $C_{IN} = C_{IN1} + C_{IN2}$ |
| $C_{IN1}$: 12 codes |
| $C_{IN2}$: 12 codes |
| $C_{HO} = C_{HO1} + C_{HO2}$ |
| $C_{HO1}$: 16 codes |
| $C_{HO1}$: 16 codes |
| $C_1 = C_{IN1} + C_{HO1}$ |

TABLE II-continued

| Code set |
|---|
| $C_2 = C_{IN1} + C_{HO2}$ |
| $C^+ = C_1 + C_2$ |

In Table II, $C_{HO}$ refers to the code set arranged for handover ranging (random access) in the configuration 0, where $C_{HO1}$ is the first half of the code set $C_{HO}$; $C_{HO2}$ is the second half of the code set $C_{HO}$. For example, initially in the default configuration, there are 16 codes arranged for $C_{HO1}$; 16 codes for $C_{HO2}$. Furthermore, $C_1$ refers to a combination of $C_{IN1}$ and $C_{HO1}$; $C_2$ refers to a combination of $C_{IN2}$ and $C_{HO2}$. In addition, $C^+$ refers to a combination of $C_1$ and $C_2$.

Based on the example shown in Table II, the temporary configurations can be found by re-arranging (or operating on) the default configurations. For example, in configuration 1, the code set temporarily re-arranged for the priority level, $P_1$, can be a combination of $C_1^{(0)}$ and $C_1$. For another example, in configuration 5, the code set temporarily re-arranged for the priority level, $P_2$, can be a combination of $C_2^{(0)}$ and $C_2$. For yet another example, in configuration 9, the code set temporarily re-arranged for the priority level, $P_3$, can be a combination of $C_3^{(0)}$ and $C^+$.

In Table I, the notation "$\phi$" refers to no code set reserved for the particular ranging (random access) in the corresponding configuration. For example, in configuration 3, since all code sets of the initial ranging (random access), $C_{IN}$, and the handover ranging (random access), $C_{HO}$, are lent to the priority level $P_1$, there will be no code set reserved for the initial ranging (random access) and the handover ranging (random access). However, the present disclosure is not limited to Table I and Table II, and the code partitions (in the default configuration and the temporary configuration) for different priority levels can be designed different from Table I and Table II, so as to satisfy practical system requirements of the wireless communication network.

In the fourth proposal, when a base station detects some priority level, $P_a$, is a congestion level, the base station can adopt a temporary configuration j to borrow some ranging (random access) codes such that the code set, $C_a^{(j)}$, is large enough to relieve congestion of the priority level, $P_a$. The base station can notify the mobile stations (within its radio service coverage) of the configuration changing through ranging response message (random access response message). After the congestion is relieved, the base station selects a suitable configuration h to return the borrowed ranging (random access) codes. However, the disclosure is not limited thereto, and in other embodiments, the base station can also increase the dedicated random access opportunities of a priority level by temporarily allocating new piece of radio resource in time domain, in frequency domain, or in code domain for the priority level.

Since the ranging (random access) response message is not broadcast information, a wireless communication device, which performs low priority ranging (random access) attempt, may be unaware of configuration changing. Hence, the wireless communication device may use a ranging (random access) code which had been lent to the higher priority level, $P_a$. In the fifth proposal, when the wireless communication device receives the ranging (random access) response with notification of changing to temporary configuration, the wireless communication device can determine whether the used ranging (random access) code had been lent to the higher priority level, $P_a$. If the determination result is yes, the wireless communication device shall give up using the allocated UL grant bandwidth from the base station to transmit its MAC message.

FIG. 3 illustrates a prioritized contention resolution operation according to the first exemplary embodiment. Referring to FIG. 3, initially in step 301 to step 304, similar to the step 201 to the step 204, a high priority level (e.g., priority level $P_1$) M2M device 21 receives the system information and performs the dedicated ranging (random access) with a selected ranging (random access) code from the default ranging (random access) code set $C_1^{(0)}$, the base station 10 detects the priority level $P_1$ (in the current configuration) is congestion level, so the base station 10 replies a ranging (random access) response to the high priority level M2M device 21 and also notifies the high priority level M2M device 21 of changing to a temporary configuration through the ranging (random access) response. The ranging (random access) response in the step 304 is monitored by those wireless communication devices which intends performing ranging (random access).

In step 305, the high priority level M2M device 21 adopts the temporary configuration and sends another dedicated ranging (random access) to the base station 10 by using the temporary configuration. At the same time, another low priority level M2M device 22 receives the system information and performs initial ranging (random access) with a selected ranging (random access) code from the default ranging (random access) code set $C_{IN}^{(0)}$. Since the low priority level M2M device 22 is unaware of configuration changing, it may use a ranging (random access) code which had been lent to the higher priority level, $P_1$. In step 306, when the low priority level M2M device 22 receives the ranging (random access) response with notification of changing to temporary configuration, the low priority level M2M device 22 can discover the used ranging (random access) code had been lent to the higher priority level, $P_1$. It implies that the UL bandwidth granted by the base station 10 in the ranging (random access) response message can also be used by the high priority level wireless communication device 21. Therefore, the low priority level M2M device 22 subsequently gives up the UL grant bandwidth in step 307, and the high priority level wireless communication device 21 continues to transmit a MAC request message to the base station 10 in step 308. In other words, the ranging (random access) response with notification of changing to temporary configuration received by the low priority level M2M device 22 can be an indication, which indicates the random access message may encounter a contention, and a high priority wireless communication device may use the uplink grant from the base station.

However, legacy UE(s) can not discover the used ranging (random access) code had been lent to a higher priority level after receiving the ranging (random access) response with notification of changing to temporary configuration. In order to provide backward compatibility, the present disclosure proposes that for each ranging (random access) code which is temporarily rearranged for other priority level, the response in the ranging response (or random access response, RAR) message is "not success" but add a new extension information element (IE) in the ranging response (or random access response) message, where the extension IE further indicates the actual response for the ranging (random access) code. Therefore, the wireless communication device(s), which support the proposed prioritized random access method, can read the actual response. On the other hand, the legacy UE(s), which do not support the proposed prioritized random access method, can read the response of "not success".

Figure 4:
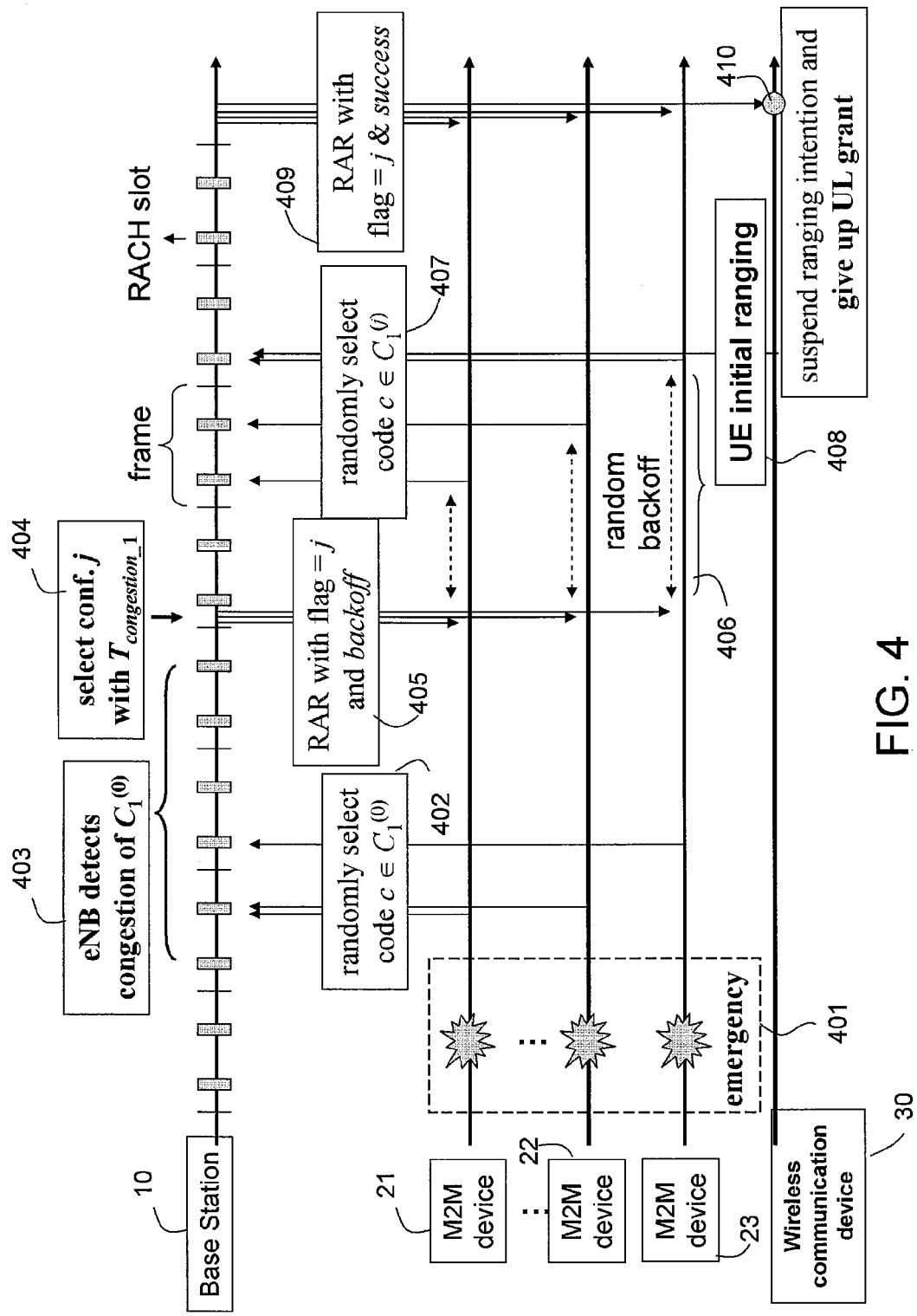
FIG. 4 illustrates another prioritized contention resolution operation according to the first exemplary embodiment.

FIG. 4 illustrates another prioritized contention resolution operation according to the first exemplary embodiment.

Referring to FIG. 4, the scenario includes a normal UE 30, which intends to perform an initial ranging (random access), and MTC devices 21, 22, 23 with the same priority level, $P_1$. MTC devices 21, 22, 23 all encounter an emergency in step 401, and thus the MTC devices 21, 22, 23 all attempt to perform ranging (random access) in step 402. In the step 402, the MTC devices 21, 22, 23 respectively and randomly select ranging (random access) codes from a ranging (random access) code set $C_1^{(0)}$, and transmit a ranging (random access) code to the base station 10. In step 403, the base station 10 detects congestion of the ranging (random access) code set $C_1^{(0)}$. Thus, in step 404, the base station 10 selects a temporary configuration, j, and initiates a timer, $T_{congestion\_1}$ for the temporary configuration. In step 405, the base station 10 transmits a ranging (random access) response (or a RAR) message with a flag=j, and responds "backoff" to all ranging (random access) codes which belong to $C_1^{(0)}$ in the ranging (random access) response message. After receiving the ranging (random access) response (or a RAR) message with a flag=j, the MTC devices 21, 22, 23 can know that the default configuration is changed to the configuration j.

Thus, in the step 406, the MTC devices 21, 22, 23 respectively perform short random backoff procedures based on the responses in the ranging (random access) response message. In the step 407, the MTC devices 21, 22, 23 respectively and randomly select ranging (random access) codes from a ranging (random access) code set $C_1^{(j)}$, and transmit ranging (random access) requests to the base station 10. Meanwhile, during the period when the MTC devices 21, 22, 23 respectively perform ranging (random access) in the step 407, the UE 30 performs initial ranging (random access) in step 408. All ranging (random access) messages are transmitted in, for example, random access channel (RACH) slot within a frame or across several frames as illustrated in FIG. 4.

According to the previous discussion on the backward compatibility, after receiving the ranging (random access) of the step 407 and the initial ranging (random access) of the step 408, the base station 10 replies another ranging response (or a RAR) message with a flag=j, responds "success" to all ranging (random access) codes which belong to $C_1^{(j)}$ by using extension IEs in the ranging (random access) response message, and responds "not success" by using original IEs in the ranging (random access) response message to all ranging (random access) codes which are temporarily rearranged for priority level $P_1$ in the configuration j. Since the UE 30 can just read the response of "not success", and the MTC devices 21, 22, 23 can read the response of "success", in step 410, the UE 30 suspends its ranging (random access) intention and gives up UL grant bandwidth. On the other hand, after the step 409, the MTC devices 21, 22, 23 can use the UL grant bandwidth to continue following transmission.

The following is the operation of the base station for temporarily changing the configuration in order to relieve the random access congestion. It is assumed that i is the index of the temporary configuration used currently, where i=0 means the default configuration is used. When the base station detects some priority level, $P_a$, is a congestion level, the base station can select a suitable configuration j such that $C_a^{(j)} \supset C_a^{(i)}$ and starts a timer $T_{congestion\_a}$. The timer $T_{congestion\_a}$ is specifically arranged (and maintained) for the priority level $P_a$. If the timer $T_{congestion\_a}$ had been started, it should be extended. The base station transmits ranging (random access) response message with a $\log_2(k+1)$-bit flag to indicate which configuration is used temporarily, where k is the number of temporary configurations. It is noted that just those wireless communication devices which intends to perform ranging (random access) procedure would monitor such ranging (random access) response message, which indicates the temporary configuration.

The base station can set the ranging (random access) responses to all CDMA ranging (random access) with codes $c \in C_a^{(i)}$ are "backoff". When the timer $T_{congestion\_a}$ expires, the base station can select a suitable configuration h such that $C_a^{(h)} = C_a^{(0)}$. If $T_{congestion\_a} = 0$ for all $1 \le a \le n$, h=0. That is, the default configuration is selected when all the timer(s) for each priority levels $P_1, P_2, P_3, \ldots, P_n$ are expired. If backward compatibility is supported, for each ranging (random access) code which is temporarily rearranged for another priority level, the base station can set the ranging (random access) response in the ranging response (or random access response, RAR) message is "not success" but add a new extension IE in the ranging response (or random access response) message, where the extension IE further indicates the actual response (e.g., "backoff", "success", or "not success") for the ranging (random access) code.

Figure 5:
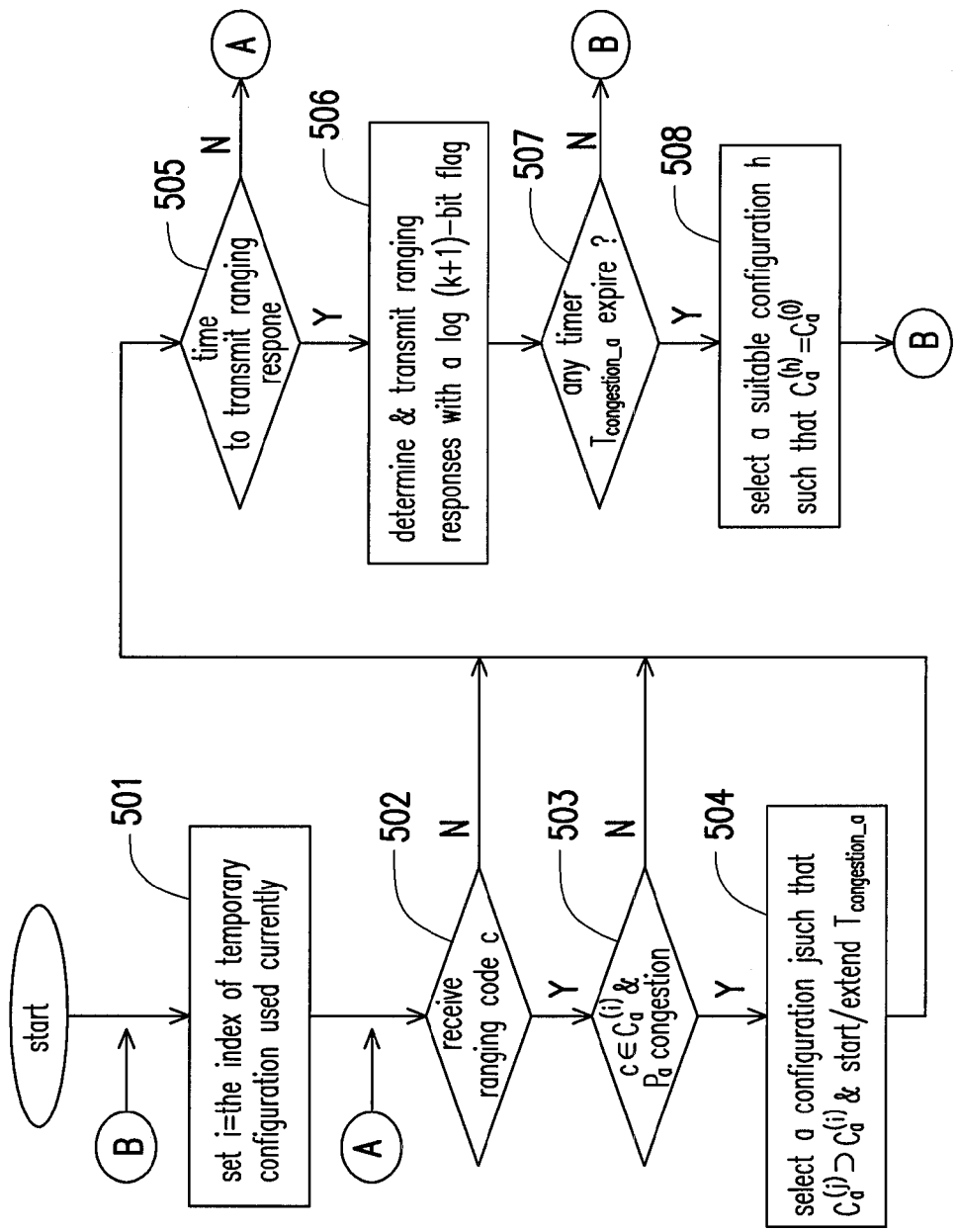
FIG. 5 is a flowchart illustrating an operation of the base station temporarily changing the configuration according to the first exemplary embodiment.

FIG. 5 is a flowchart illustrating an operation of the base station temporarily changing the configuration according to the first exemplary embodiment. Referring to FIG. 5, in step 501, the base station sets i to be the index of temporary configuration used currently. In step 502, the base station determines whether the base station receives a ranging (random access) code, c. When the base station receives a ranging (random access) code, c, in the step 502, step 503 is executed after the step 502; otherwise, step 505 is executed after the step 502.

In the step 503, the base station further determines whether the received ranging (random access) code, $c \in C_a^{(i)}$, and the priority level, $P_a$, is a congestion level. When the base station confirms that the received ranging (random access) code, $c \in C_a^{(i)}$, and the priority level, $P_a$, is the congestion level, then step 504 is executed after the step 503; otherwise, the step 505 is executed after the step 503.

In the step 504, in order to relieve the random access congestion, the base station selects a suitable configuration j such that $C_a^{(j)} \supset C_a^{(i)}$ and starts or extends a timer $T_{congestion\_a}$. In the step 505, the base station determines whether it is the time to transmit ranging (random access) response. When the base station confirms that it is the time to transmit ranging (random access) response, step 506 is executed after the step 505; otherwise, step 502 is executed after the step 505.

In the step 506, the base station determines a $\log_2(k+1)$-bit flag (for the ranging response message) to indicate which configuration is used temporarily, and transmits the ranging (random access) response message with the $\log_2(k+1)$-bit flag, where k is the number of temporary configurations. In step 507, the base station determines whether the timer $T_{congestion\_a}$ expires. When the timer $T_{congestion\_a}$ is expired in the step 507, step 508 is executed after the step 507; otherwise, the step 501 is executed. In step 508, when the timer $T_{congestion\_a}$ is expired, the base station selects a suitable configuration h such that $C_a^{(h)} = C_a^{(0)}$. The step 501 is executed after the step 508.

When an idle M2M device intends to perform network entry for transmitting delay-sensitive messages in priority level $P_a$, the M2M device receives the system information first to know the current default configuration of ranging (random access) code partition. After obtaining the default configuration, the M2M device randomly selects a ranging (random access) code $c \in C_a^{(0)}$ to perform CDMA ranging. If the base station detects the ranging (random access) code, the base station replies a flag to indicate which configuration is used temporarily and a ranging (random access) response to indicate whether the CDMA ranging (random access) is successful, not successful, or needing a short backoff (i.e., the case of base station detecting congestion). For the purpose of explanation, it is assumed that the value of the flag is i. When $C_a^{(i)} = C_a^{(0)}$ (i.e., the ranging (random access) code set reserved for the priority level $P_a$ in configuration i is not changed) and the response of the CDMA ranging (random access) is not successful, the M2M device performs random backoff and then CDMA ranging (random access) again. If $C_a^{(i)} = C_a^{(0)}$ and the response of the CDMA ranging (random access) is successful, the base station allocates UL grant bandwidth for the successful ranging attempt subsequently. Moreover, the M2M device uses the UL grant bandwidth to transmit the following MAC request message and waits for the corresponding response message form the base station.

When $C_a^{(i)} \ne C_a^{(0)}$ (i.e., $P_a$ is a congestion level and the configuration is temporarily changed to i), the M2M device performs a short random backoff and then the CDMA ranging (random access) again with a ranging code $c' \in C_a^{(i)}$. When the flag is still equal to i after receiving the ranging (random access) response message of the second CDMA ranging (random access), the M2M device operates according to the result of the second CDMA ranging (random access). Otherwise, when the flag is changed to j and $j \ne i$, the operation of the M2M device should be further discussed in order to guarantee a high priority ranging is served earlier than a low priority ranging. When the temporary configuration is changed from i to j, it means that random access congestion in some priority level $P_b$ occurs or some timer $T_{congestion\_b}$ expires after the M2M device receives the ranging (random access) response of the first CDMA ranging (random access). When $C_a^{(j)}$ is equal to $C_a^{(i)}$, the M2M device operates according to the result of the second CDMA ranging (random access). When $C_a^{(j)} \supset C_a^{(i)}$, it means that random access congestion in the priority level $P_a$ still occurs after changing configuration from 0 to i and the base station changes configuration again from i to j. Therefore, in such as case, the M2M device should perform a short random backoff and then the CDMA ranging (random access) again with a ranging (random access) code $c'' \in C_a^{(j)}$. Otherwise, when $C_a^{(j)} \subset C_a^{(i)}$, it means that some ranging (random access) codes which belong to $C_a^{(i)}$ are lent to level $P_b$ in the configuration j or $T_{congestion\_a}$ expires. In this case, when the ranging (random access) code c' belongs to a priority level $P_b$ in the configuration j and priority order is $P_a < P_b$, the second CDMA ranging (random access) of the M2M device may collide with another CDMA ranging in level $P_b$. Therefore, in such as case, the M2M device should assume the second CDMA ranging (random access) is not successful even if the ranging (random access) response is successful. Otherwise, when priority order is $P_a \ge P_b$, the M2M device operates according to the result of the second CDMA ranging. The detailed ranging operation of M2M devices for transmitting delay-sensitive traffic in level $P_a$ is described as following.

Figure 6:
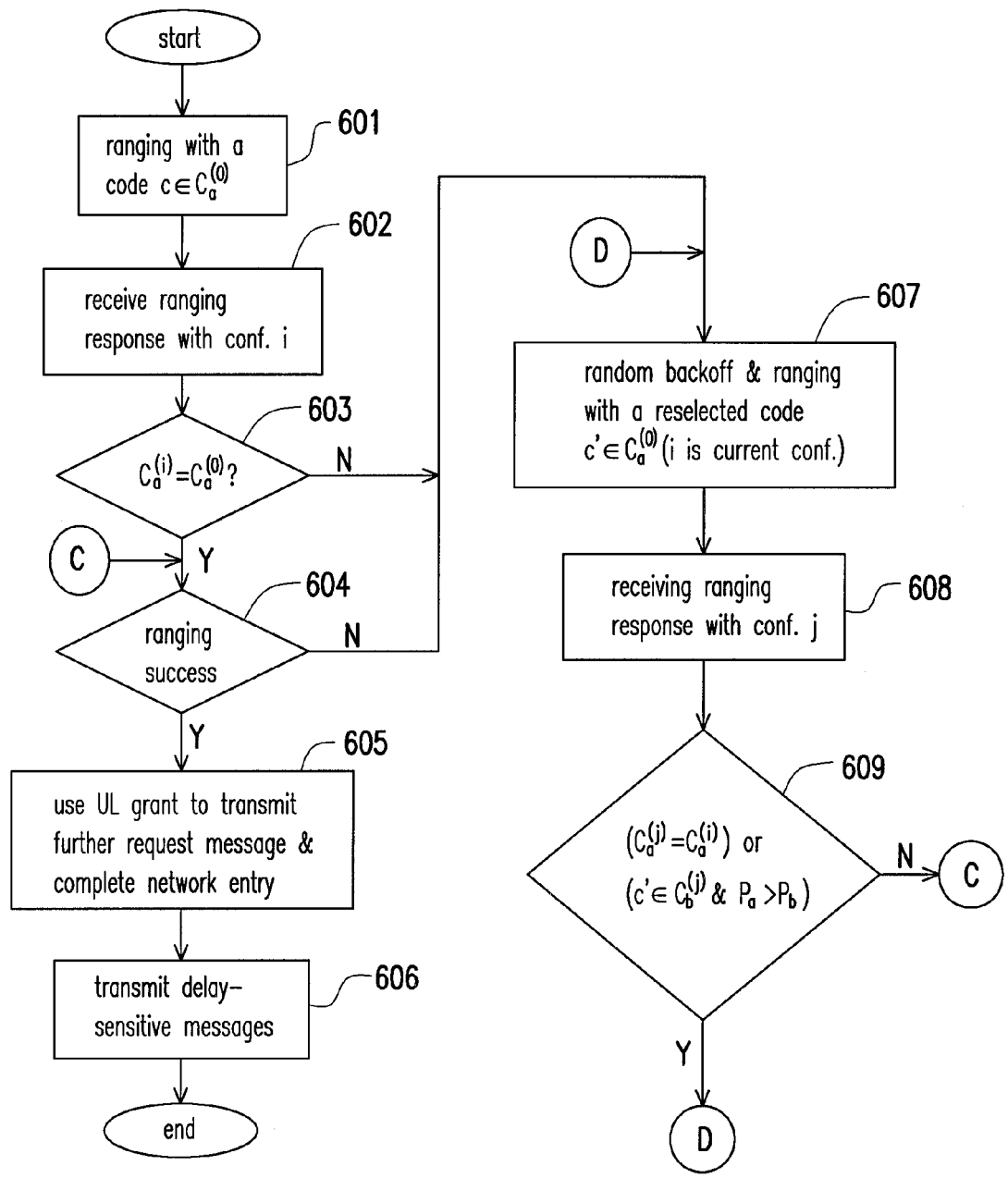
FIG. 6 is flowchart of a ranging operation of a M2M device for transmitting delay-sensitive traffic.

FIG. 6 is flowchart of a ranging (random access) operation of a M2M device for transmitting delay-sensitive traffic. Referring to FIG. 6, in step 601, the M2M device in the priority level $P_a$ performs ranging (random access) with a ranging (random access) code $c \in C_a^{(0)}$. In step 602, the M2M device receives a ranging (random access) response message with flag is i (i.e., the current configuration is configuration i) from a base station. In step 603, the M2M device determines whether $C_a^{(i)} = C_a^{(0)}$. When the M2M device confirms that $C_a^{(i)} = C_a^{(0)}$, then step 604 is executed after the step 603; otherwise, when the M2M device confirms that $C_a^{(i)} \ne C_a^{(0)}$, then step 607 is executed after the step 603.

In step 604, the M2M device determines whether the previous ranging (random access) is successful according to the received ranging (random access) response. When the M2M device confirms the previous ranging (random access) is successful, then step 605 is executed after the step 604; otherwise, step 607 is executed after the step 604. In step 605, the M2M device uses the allocated UL grant bandwidth to transmit further request message and complete network entry. In step 606, the M2M device subsequently transmits the delay-sensitive message(s).

On the other hand, in the step 607, the M2M device performs a (short) random backoff procedure, and then perform a ranging (random access) again with a reselected ranging code $c' \in C_a^{(i)}$, where the configuration, i, is the current configuration. In step 608, the M2M device receives a second ranging (random access) response with the flag is j (note that j may be equal to i or not equal to i). In step 609, the M2M device determines whether the following condition is satisfied: $(C_a^{(j)} = C_a^{(i)})$ or $(c' \in C_b^{(j)}$ & $P_a > P_b)$. When the aforementioned condition is satisfied, i.e., the determination result is yes, then step 604 is executed again after the step 609; otherwise, the step 607 is executed after the step 609. The ranging (random access) operation of the M2M device is completed after the step 606.

When an idle mobile station intends to perform a normal network entry, it also firstly receives the system information. After obtaining the default configuration, the mobile station randomly selects a ranging (random access) code $c \in C_{IN}^{(0)}$ to perform CDMA ranging. When the flag indicated in the ranging response message is i and $c \in C_{IN}^{(i)}$, the mobile station operates according to the result of the CDMA ranging (random access). Otherwise, when $c \notin C_{IN}^{(i)}$, it means that random access congestion in some priority level $P_a$ occurs and the ranging (random access) code c is lent to level $P_a$ in configuration i. Since the priority of normal initial ranging (random access) is lower than all levels, if the ranging (random access) code c is lent to level $P_a$ in configuration i, the CDMA ranging (random access) of the mobile station may collide with another CDMA ranging in level $P_a$. Therefore, in such case, the mobile station should assume the CDMA ranging (random access) is not successful even if the ranging (random access) response is successful. The detailed ranging (random access) operation of mobile stations for performing the normal network entry is described as following.

Figure 7:
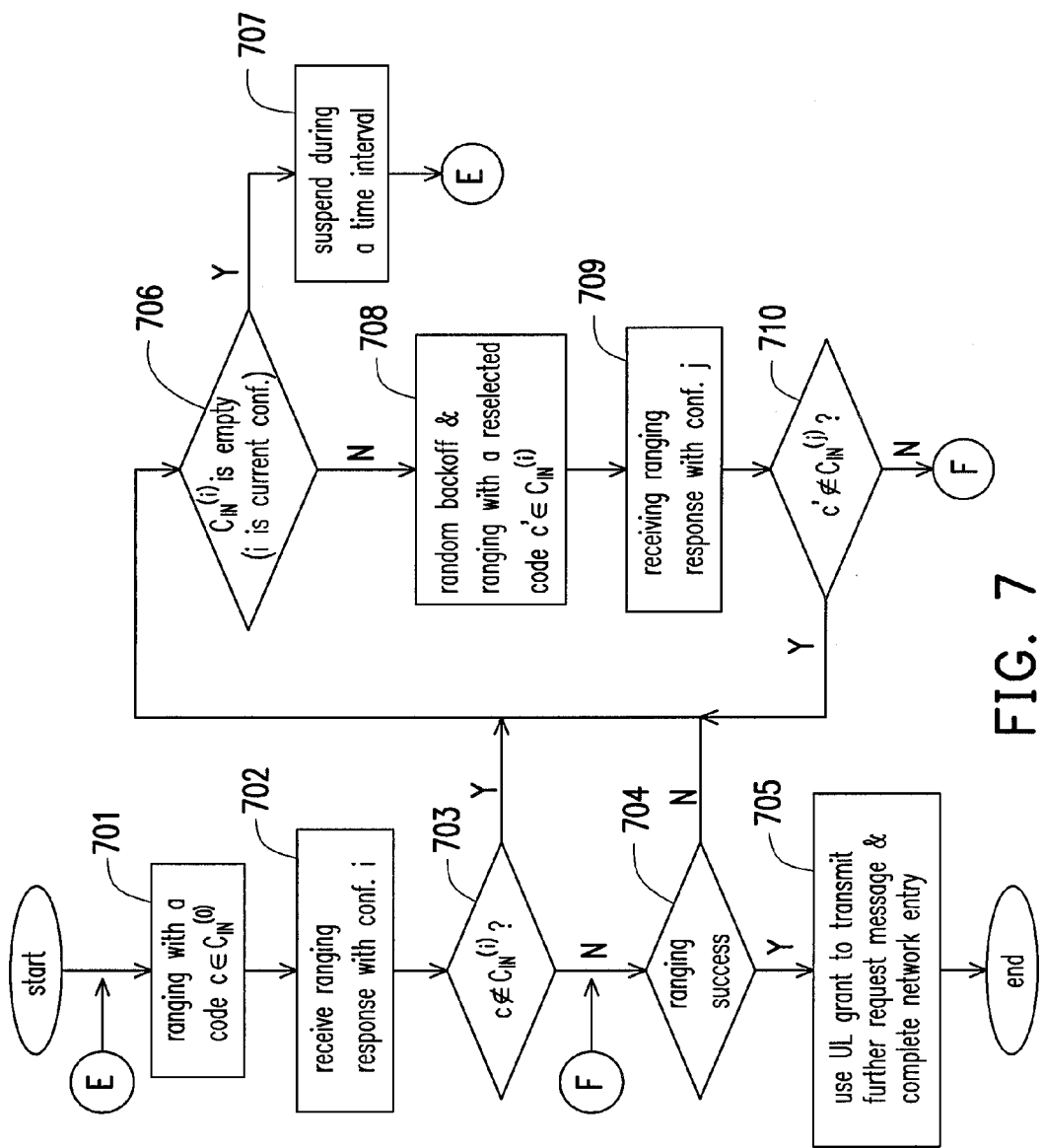
FIG. 7 is flowchart of a ranging operation for a mobile station to perform a normal network entry.

FIG. 7 is flowchart of a ranging operation for a mobile station to perform a normal network entry. Referring to FIG. 7, in step 701, the mobile station performs a ranging (random access) with a ranging (random access) code $c \in C_{IN}^{(0)}$. In step 702, the mobile station receives a ranging (random access) response message with flag is i (i.e., the current configuration is changed from the default configuration to configuration i) from a base station. In step 703, the M2M device determines whether $c \notin C_{IN}^{(i)}$. When the mobile station confirms that $c \notin C_{IN}^{(i)}$, then step 706 is executed after the step 703; otherwise, when the mobile station confirms that $c \in C_{IN}^{(i)}$, then step 704 is executed after the step 703.

In the step 704, the mobile station determines whether the previous ranging (random access) is successful according to the received ranging (random access) response. When the mobile station confirms the previous ranging (random access) is successful, then step 705 is executed after the step 704; otherwise, the step 706 is executed after the step 704. In step 705, the mobile station uses the allocated UL grant bandwidth to transmit further request message and complete network entry.

In step 706, the mobile station determines whether the ranging code set $C_{IN}^{(i)}$ is an empty set, where the configuration, i, is the currently used configuration. When the mobile station confirms that the ranging (random access) code set $C_{IN}^{(i)}$ is an empty set in the step 706, then step 707 is executed after the step 706; otherwise, when the mobile station confirms that the ranging (random access) code set $C_{IN}^{(i)}$ is not an empty set in the step 706, then step 708 is executed after the step 706. In the step 707, the mobile station suspends during a pre-defined time interval, where the pre-defined time interval can be, for example, broadcast in the system information from the base station in advance.

In step 708, the mobile station performs a random backoff procedure, and then performs a ranging (random access) again with a re-selected ranging (random access) code $c' \in C_{IN}^{(i)}$, where the configuration, i, is the current configuration. In step 709, the mobile station receives a ranging (random access) response with the flag being j (note that j may be equal to i or not equal to i). In step 710, the mobile station further determines whether the following condition is satisfied: the selected ranging (random access) code, $c \notin C_{IN}^{(j)}$. When the aforementioned condition is satisfied, then the step 706 is executed again after the step 710; otherwise, the step 704 is executed after the step 710. The ranging (random access) operation of the mobile station performing a normal network entry is completed after the step 705.

Second Exemplary Embodiment

According to the contention-based random access procedure specified in LTE, when multiple UEs select the same random access resource (i.e., the same preamble, the same PRACH, and same subframe), these UEs can use the same UL grant bandwidth given by the eNB in RAR to transmit RRC Connection Request message (also known as, Msg3), thereby resulting in collisions. In order to resolve contention, UE sends its identifier to the network in Msg3. Besides, non-adaptive HARQ is adopted for Msg3 transmissions to increase the probability of successful decoding. If the eNB successfully receive an Msg3 from some UE, it echoes back the received UE identifier to resolve the contention. The UE, which has received its ID, continues the transmission while other UEs will back off and try again.

The maximum number of HARQ transmissions for Msg3 is configured by the parameter maxHARQ-Msg3Tx in SIB2. If the parameter maxHARQ-Msg3Tx is also applied for MTC devices (also known as, M2M devices), MTC devices experience the same access collision probability as normal UEs. However, most of random access attempts from MTC devices have lower priority than normal UEs. In order to guarantee a high priority ranging (random access) is served earlier than a low priority ranging (random access), a mechanism (of the prioritized contention resolution) illustrated in FIG. 3 can be used. That is, there is proposed a prioritized contention resolution method to increase the probability that the eNB successfully receives the Msg3 from a normal UE rather than other MTC devices.

Figure 8:
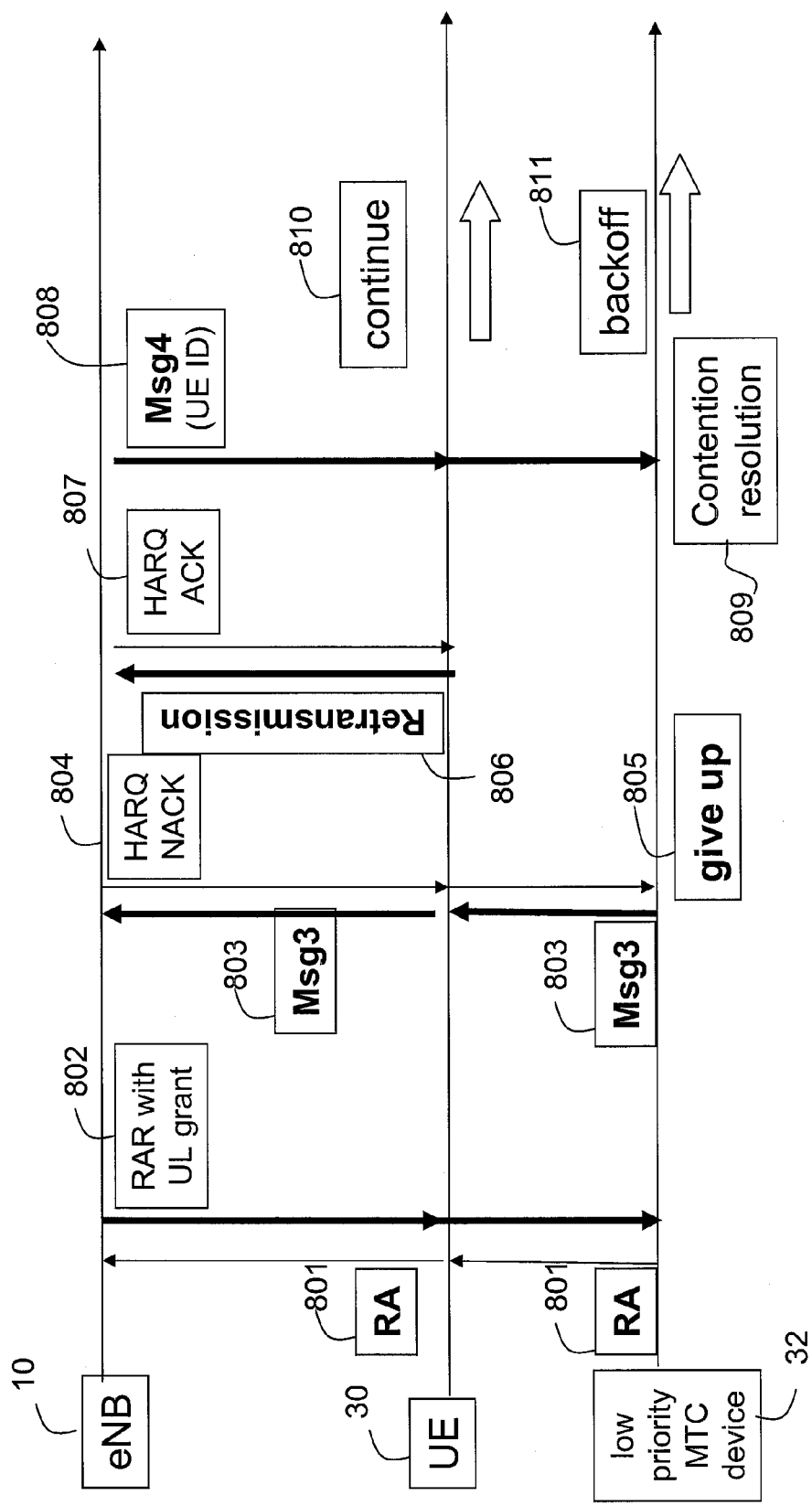
FIG. 8 illustrates a prioritized random access method according to a second exemplary embodiment.

FIG. 8 illustrates a prioritized random access method according to the second exemplary embodiment. Referring to FIG. 8, in step 801, both a UE 30 and a low priority MTC device 32 select the same random access resource to perform random access (RA) procedure. Also, the UE 30 mainly carries out human-to-human (H2H) traffic. After the eNB 10 receives the RA message, the eNB 10 replies a random access response (RAR) with UL grant bandwidth in step 802. In step 803, since both the UE 30 and the low priority MTC device 32 select the same RA resource, the UE 30 and the low priority MTC device 32 transmit the Msg3 by using the same UL bandwidth granted by the eNB 10 in the replied RAR message, thereby resulting in collision. In step 804, the eNB 10 cannot decode the Msg3 successfully, so the eNB 10 replies a HARQ NACK to both the UE 30 and the low priority MTC device 32. The HARQ NACK from the eNB 10 implicitly notifies both the UE 30 and the low priority MTC device 32 that their previous RA procedure is not successful.

In the second exemplary embodiment, in step 805, the low priority MTC device 32 gives up Msg3 retransmission when the HARQ NACK is received from the eNB. In fact, when both the UE 30 and the low priority MTC device 32 receive HARQ NACK from the eNB 10, the UE 30 selects a first upper threshold for HARQ transmission for Msg3, and low priority MTC device 32 selects a second upper threshold for HARQ transmission for Msg3. For example, the maximum number of HARQ transmission for Msg3 is maxHARQ-Msg3Tx in SIB2, and maxHARQ-Msg3Tx=INTEGER(1:8). The UE 30 can select "8" as the first upper threshold for HARQ transmission for Msg3. The low priority MTC device 32 can select "1" as the second upper threshold for HARQ transmission for Msg3. Thus, the UE 30 retransmits the Msg3 in step 806 since the number of HARQ transmission for Msg3 for the UE 30 has not exceeded the first upper threshold for HARQ transmission for Msg3. In other words, the low priority MTC device 32 shall decrease the number of non-adaptive HARQ transmissions for Msg3. Since the UE 30 has more chance to retransmit Msg3, the probability that the eNB 10 successfully receives the Msg3 from the UE 30 is greatly increased than that from the low priority MTC device 32.

In step 807, the eNB 10 successfully receives the Msg3 from the UE 30, so the eNB 10 transmits HARQ positive acknowledgement (ACK) to the UE 30. In step 808, the eNB 10 further transmits a Msg4 (with a UE ID corresponding to the Msg3 from the UE 30) to both the UE 30 and the low priority MTC device 32. Therefore, in step 809, when the low priority MTC device 32 receives the Msg 4 (with the UE ID), the low priority MTC device 32 realizes that the Msg 4 is not for itself, and thus the contention is resolved. In step 810, the UE 30 continues subsequent transmission or process. In step 811, the low priority MTC device 32 performs a backoff procedure.

In summary, according to the exemplary embodiments of the disclosure, prioritized random access methods are proposed. Dedicated random access opportunities are reserved for different priority levels, where random access attempts are classified into the priority levels according to delay requirements in advance. A congestion detecting mechanism is introduced for such dedicated ranging (random access) opportunities. When congestion is detected by the base station, parameters or configurations of random access can be dynamically or temporarily modified through random access response message. A prioritized contention resolution is introduced to guarantee a high priority access is processed earlier than a low priority access. Another prioritized contention resolution is introduced to reduce the impact of random access of a low priority M2M device upon H2H traffic.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A prioritized random access method, configured for a base station, comprising:
   classifying random access attempts of wireless communication devices into at least a priority level;
   associating each of the priority levels respectively with a set of dedicated random access opportunities;
   broadcasting default configuration of the dedicated random access opportunities;
   receiving random access messages from the wireless communication devices;
   detecting congestion of the random access messages which belong to a first priority level;
   changing the dedicated random access opportunities, wherein the step of changing the dedicated random access opportunities comprises: increasing the dedicated random access opportunities of the first priority level by temporarily borrowing random access opportunities of at least a second priority level, wherein the at least a second priority level is lower than the first priority level; and
   notifying the change of the dedicated random access opportunities by a response message to some wireless communication devices, whose transmitted random access messages are congested.

2. The prioritized random access method according to claim 1, wherein the at least a priority level is single level or a plurality of levels.

3. The prioritized random access method according to claim 1, wherein the dedicated random access opportunities comprises dedicated codes, dedicated time slots, dedicated frequency resource, and any combination of the dedicated codes, the dedicated time slots, or the dedicated frequency resource.

4. The prioritized random access method according to claim 1, wherein the step of broadcasting the default configuration of the dedicated random access opportunities comprises:
   periodically broadcasting the default configuration of the dedicated random access opportunities of all the priority levels.

5. The prioritized random access method according to claim 1, wherein the step of detecting the congestion of the random access messages comprises:
   monitoring a utility rate of the dedicated random access opportunities of each of the priority levels over a pre-defined period; and
   determining a first priority level of the priority levels to be in congestion when the utility rate of the dedicated random access opportunities of the first priority level over the pre-defined period is greater than a pre-defined utility upper threshold.

6. The prioritized random access method according to claim 1, wherein the change of the dedicated random access opportunities comprises a temporary configuration being a rearrangement rule operated on default configuration of the dedicated random access opportunities of all priority levels.

7. The prioritized random access method according to claim 1, wherein the change of the dedicated random access opportunities comprises a temporary configuration being pre-defined and indexed.

8. The prioritized random access method according to claim 1, wherein the at least a priority levels is the single level or a plurality of levels, the change of the dedicated random access opportunities comprises:
   increasing the dedicated random access opportunities of a first priority level by temporarily allocating new piece of radio resource in time domain, in frequency domain, or in code domain.

9. The prioritized random access method according to claim 1, wherein the change of the dedicated random access opportunities comprises a temporary configuration, and the step of changing the dedicated random access opportunities comprises:

maintaining a timer for a first priority level for indicating a valid period of the temporary configuration; and changing the temporary configuration to another temporary configuration of the dedicated random access opportunities of the first priority level when the timer expires.

10. The prioritized random access method according to claim 9, wherein the step of changing the dedicated random access opportunities further comprises:

respectively maintaining at least a timer, $T_{congestion\_a}$, for at least a priority level, $P_a$, for indicating at least a valid period of the temporary configuration of the at least a priority level, $P_a$; and restoring the temporary configuration to default configuration of the dedicated random access opportunities of all priority levels when all of the at least a timer, $T_{congestion\_a}$ for all of the at least a priority level, $P_a$, expires.

11. The prioritized random access method according to claim 1, wherein when the at least a priority level is a plurality of levels, the step of notifying the change of the dedicated random access opportunities by the response message comprises:

responding "not success" by using an original information element in the random access response but also adding an extension information indicating an actual response.

12. A prioritized random access method, configured for a wireless communication device achieving prioritized contention resolution, comprising:

using a random access opportunity to transmit a random access message with a base station, wherein the random access message belongs to a first priority level;

receiving a random access response from the base station as a response for the random access message, wherein the random access response comprises an uplink grant;

receiving an indication from the base station; and determining to give up uplink grant from the base station according to the indication and the priority level of the random access message, wherein the step of determining to give up the uplink grant from the base station according to the indication and the priority level comprises:

determining whether the used random access opportunity is lent to a higher priority level according to the indication;

continuing to transmit a request message using the allocated uplink grant from the base station when the used random access opportunity is not lent to a higher priority level according to the indication; and determining to give up the uplink grant from the base station for transmitting a request message when the used random access opportunity is lent to a higher priority level according to the indication.

13. The prioritized random access method according to claim 12, wherein the indication indicates the random access message encounters a contention, and a high priority wireless communication device uses the uplink grant from the base station.

14. The prioritized random access method according to claim 13, wherein the indication is an index of a temporary configuration in the random access message.

15. The prioritized random access method according to claim 13, wherein the indication is a hybrid automatic request feedback message.

16. The prioritized random access method according to claim 15, wherein the step of determining to give up the uplink grant from the base station according to the indication and the priority level comprises:

determining whether the wireless communication is a low priority level wireless communication device;

determining whether the hybrid automatic request feedback message is a negative acknowledgement message; and determining to give up the uplink grant from the base station for transmitting a request message when wireless communication is a low priority level wireless communication device and the hybrid automatic request feedback message is a negative acknowledgement message.

17. The prioritized random access method according to claim 12, wherein:

when a wireless communication device receiving the random access response supports the prioritized random access method, the wireless communication device just reads the extension information; and when a wireless communication device receiving the random access response does not support the prioritized random access method, the wireless communication device just reads the original information element in the random access response.

18. The prioritized random access method according to claim 17, wherein an actual response in the extension information is "backoff", "success", or "not success".

19. A prioritized random access method, configured for a wireless communication device transmitting a delay-sensitive message, comprising:

transmitting a first random access message using a first random access code from a code set $C_a^{(0)}$ of a default configuration for a priority $P_a$;

receiving a first random access response with a first indicator from the base station, wherein the first indicator indicates the default configuration being changed to a current configuration i;

determining whether a code set $C_a^{(i)}$ of the current configuration, i, is the same as the code set $C_a^{(0)}$ of the default configuration;

determining whether the first random access message is successful according to the first random access response;

transmitting subsequent request message by using allocated uplink grant from the base station when the first random access message is successful and the code set $C_a^{(i)}$ is the same as the code set $C_a^{(0)}$;

completing network entry; and transmitting the delay-sensitive message.

20. The prioritized random access method according to claim 19, wherein before transmitting the first random access message, the method further comprises:

receiving the default configuration of random access code partition from the base station.

21. The prioritized random access method according to claim 19, wherein when the code set $C_a^{(i)}$ is different from the code set $C_a^{(0)}$, or the first random access message is determined to be not successful, the method further comprises:

performing a short random backoff and transmitting a second random access message with a second random access code selected from the code set $C_a^{(i)}$ of the current configuration; and receiving a second random access response with the second indicator of the second random access message, wherein the second indicator indicates the current configuration is configuration j.

22. The prioritized random access method according to claim 21, wherein after receiving the second random access response, the method further comprises:
    determining whether a first condition or a second condition is satisfied, wherein:
    the first condition is that a code set $C_a^{(j)}$ of the configuration j is the same as the code set $C_a^{(i)}$; and
    the second condition is that the second random access code is from a code set of the configuration j for a priority $P_b$ and the priority $P_a$ is higher than the priority $P_b$.

23. The prioritized random access method according to claim 22, wherein when the first condition or the second condition is satisfied, the method further comprises:
    determining whether the second random access message is successful according to the second random access response.

24. The prioritized random access method according to claim 22, wherein when neither the first condition nor the second condition is satisfied, the method further comprises:
    performing a short random backoff and transmitting a third random access message with a third random access code selected from a code set of the current configuration.

25. A prioritized random access method, configured adapted for a wireless communication device performing a network entry, the prioritized random access method comprising:
    transmitting a first random access message using a first random access code from a code set $C_{IN}^{(0)}$ arranged for initial random access of a default configuration;
    receiving a first random access response with a first indicator from the base station, wherein the first indicator indicates the default configuration being changed to a current configuration i;
    determining whether the first random access code belongs to the code set $C_{IN}^{(i)}$ of the current configuration i;
    determining whether the first random access message is successful according to the first random access response;
    transmitting subsequent request message by using allocated uplink grant from the base station when the first random access code belongs to the code set $C_{IN}^{(i)}$ and the first random access message is successful; and
    completing the network entry.

26. The prioritized random access method according to claim 25, wherein before transmitting the first random access message, the method further comprises:
    receiving the default configuration of random access code partition from the base station.

27. The prioritized random access method according to claim 25, wherein when the first random access code does not belong to the code set $C_{IN}^{(i)}$, or the first random access message is determined to be not successful, the method further comprises:
    determining whether the code set $C_{IN}^{(i)}$ is an empty set;
    performing a short random backoff and transmitting a second random access message with a second random access code selected from the code set $C_{IN}^{(i)}$ of the current configuration when the code set $C_{IN}^{(i)}$ is not an empty set; and
    receiving a second random access response with the second indicator of the second random access message, wherein the second indicator indicates the current configuration is configuration j; and
    determining whether the second random access code belongs to the code set $C_{IN}^{(j)}$ of the current configuration j.

28. The prioritized random access method according to claim 27, wherein when code set $C_{IN}^{(i)}$ is an empty set, the method further comprises:
    suspending current random access attempt during a predefined time interval; and
    returning to transmit a third random access message using a third random access code from the code set $C_{IN}^{(0)}$.

29. The prioritized random access method according to claim 27, wherein when the second random access code does not belong to the code set $C_{IN}^{(j)}$ of the current configuration j, the method further comprises:
    returning to deteimining whether the code set $C_{IN}^{(j)}$, of the current configuration j, is an empty set.

30. The prioritized random access method according to claim 27, wherein when the second random access code belongs to the code set $C_{IN}^{(j)}$ of the current configuration j, the method further comprises:
    determining whether the second random access message is successful according to the second random access response.

* * * * *